Figure 1:
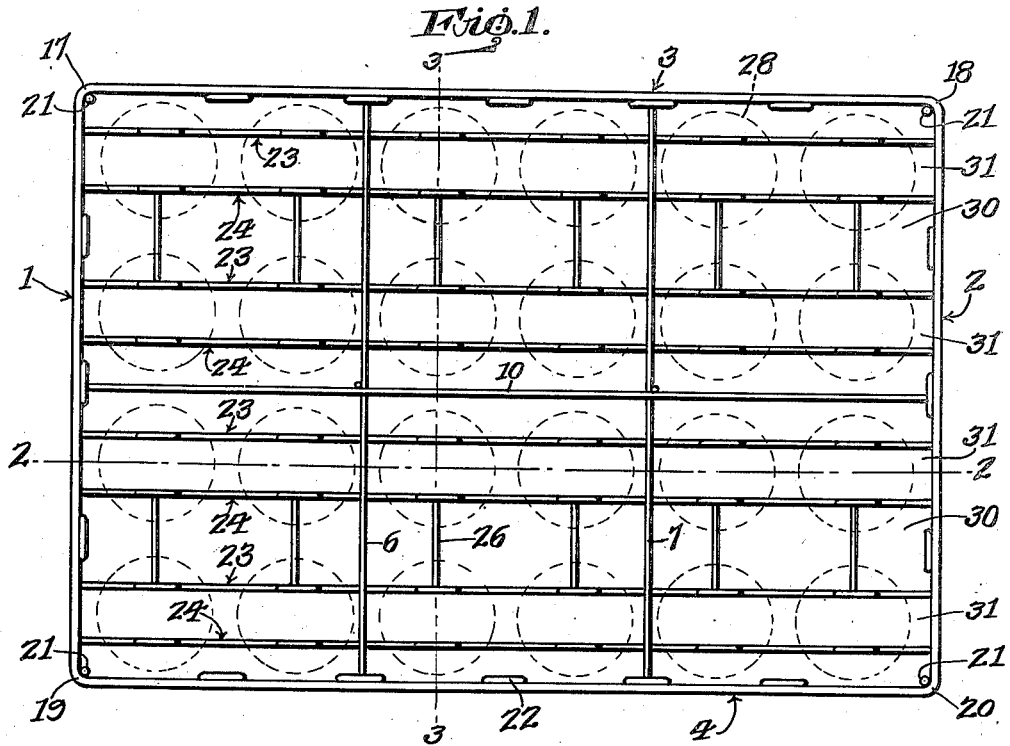

Nov. 3, 1936.  A. R. LOFSTRAND, JR  2,059,258
TRAY
Original Filed Aug. 21, 1934    2 Sheets-Sheet 1

Inventor
Anders R. Lofstrand, Jr.

By Geo. F. Kimmel
Attorney

Nov. 3, 1936.　　　A. R. LOFSTRAND, JR　　　2,059,258
TRAY
Original Filed Aug. 21, 1934　　2 Sheets-Sheet 2
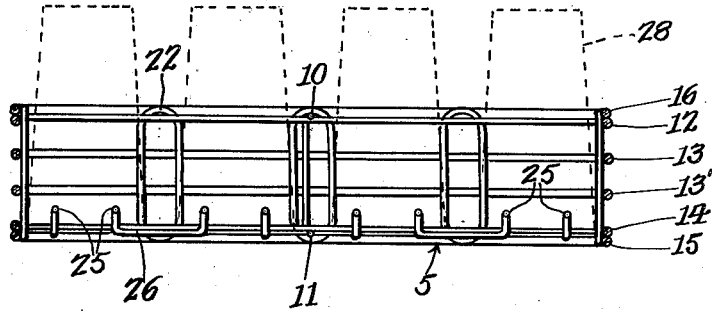
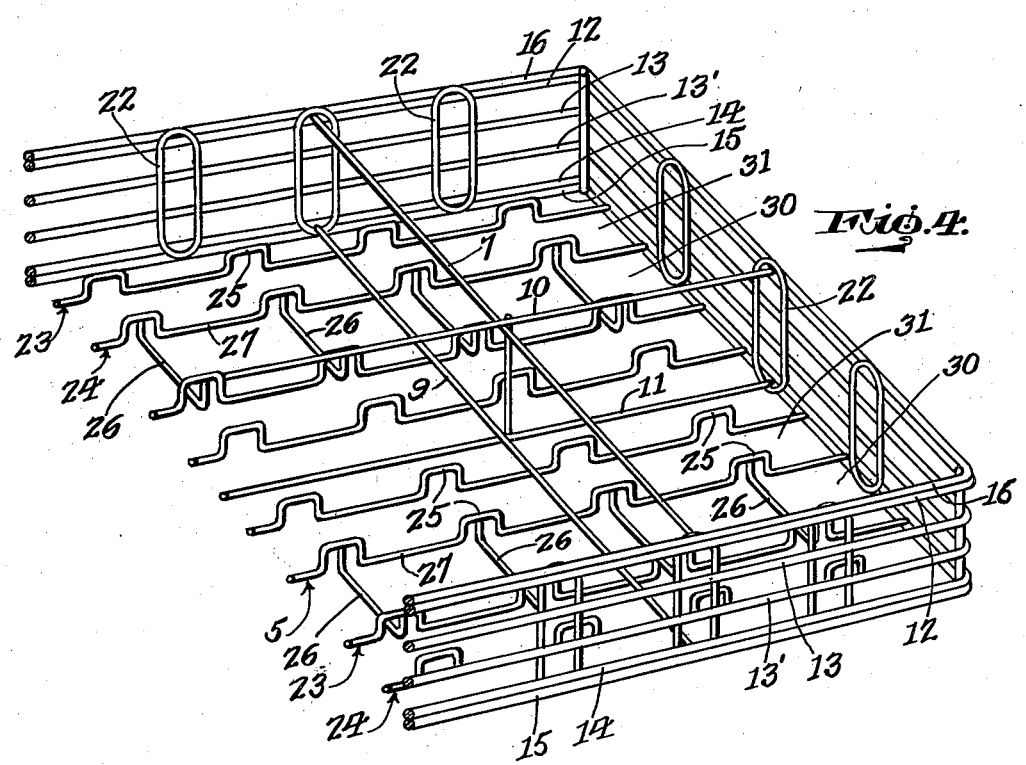
Inventor
Anders R. Lofstrand, Jr.
By Geo. P. Kimmel
Attorney Patented Nov. 3, 1936

2,059,258

UNITED STATES PATENT OFFICE 2,059,258

TRAY

Anders R. Lofstrand, Jr., Washington, D. C., assignor, by mesne assignments, to Lofstrand Company, a corporation of Delaware Application August 21, 1934, Serial No. 740,840
Renewed January 27, 1936

11 Claims. (Cl. 141—9)

This invention relates to a tray designed primarily for holding a group of drinking glasses and for use in connection with glassware washing, rinsing and drying machines, but it is to be understood that a tray, in accordance with this invention, may be employed for any purpose for which it is found applicable.

The invention has for its object to provide, in a manner as hereinafter set forth, a tray having means for supporting and maintaining a group of drinking glasses in inverted spaced relation, and in a position, to have applied to the inner and outer peripheries of the glasses of the group simultaneously, successive washing, rinsing and drying operations.

The tray with the glasses arranged thereon, as is disclosed in my co-pending application, Serial No. 740,841, filed August 21, 1934, is adapted to be first lowered in and retained in lowered position within a washing compartment containing a body of water and brushes for acting upon the outer and inner peripheries of the glasses; after the washing operation, the tray with the washed glasses thereon is removed from the washing compartment, lowered, with the glasses thereon, in, and held in lowered position within a rinsing compartment, while in the latter the glasses have their inner and outer peripheries subjected to a rinsing operation; and after the rinsing operation the tray with the glasses thereon is removed from the rinsing compartment and positioned at the top of a drying compartment, and when so positioned the glasses are subjected to currents of heated air which act to thoroughly dry the glasses interiorly and exteriorly of the latter.

The tray is of skeleton form and is so constructed to provide for the passage through the bottom thereof of brushes to act upon the inner and outer faces of the bodies of the glasses, and for extending upwardly into the glasses rinsing water and heated air discharging nozzles such as are shown in my application aforesaid, the brushes acting upon the glasses being rotatable and imparting a revoluble movement to the glasses supported by the tray.

To these ends essentially and to others which may hereinafter appear, the invention consists of such parts and such combination of parts which fall within the scope of the invention as claimed.

Figure 2:
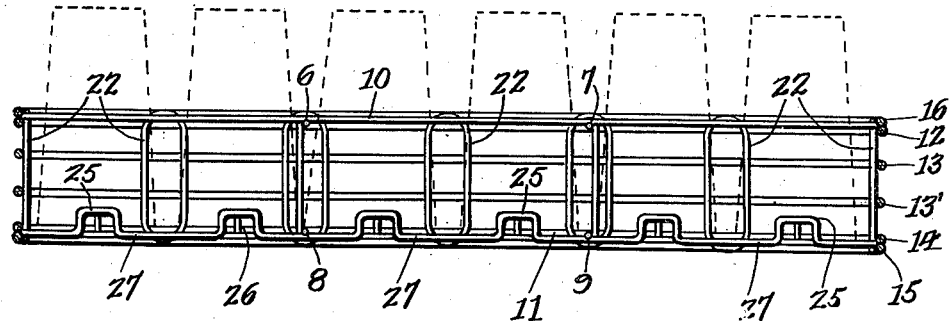

In the drawings:

Figure 1 is a top plan view of the tray showing in dotted lines a group of inverted drinking glasses supported thereby, Figure 2 is a section on line 2—2, Figure 1, Figure 3 is a section on line 3—3, Figure 1, and Figure 4 is a section of the tray in perspective.

The tray is of rectangular contour and of skeleton construction. As shown it is of a capacity for carrying and supporting twenty-four drinking glasses, but it is to be understood, however, that the capacity and contour of the tray may be as desired. Preferably the contour and capacity of the tray will be as that shown.

The tray includes a pair of end walls 1, 2, a pair of side walls 3, 4, a bottom 5, a pair of spaced parallel upper horizontally disposed braces 6, 7 constituting partition members, a pair of spaced parallel lower horizontally disposed braces 8, 9 constituting partition members aligning and coacting with the braces 6, 7 respectively, a longitudinally disposed upper brace 10 constituting a partition member, and a lower longitudinally disposed brace 11 constituting a partition member aligning and coacting with the brace 10.

The side and end walls are formed from a series of superposed spaced endless wires 12, 13, 13', 14, a lower endless wire 15 upon which the wire 14 is superimposed, and an upper endless wire 16 which is superimposed upon the wire 12. The endless wires are bent into rectangular form and are of any suitable gauge. The bends of one wire align with the bends of each other wire. The bends form the corners 17, 18, 19 and 20 of the tray. Secured against the inner face of each of said corners is a short length of wire 21 which constitutes a corner post. Secured against the inner face of each of the walls of the tray is a series of upstanding oval shaped loops 22, each formed from an endless wire. The loops 22 form braces for said walls. The wires 21 and loops 22 are flush with the top and bottom edges of said walls.

The bottom 5 includes a series of spaced pairs of spaced wires which extend from between and are secured to opposed portions of the wires 14, 15 forming the lower part of the end walls 1, 2. The outer pairs of wires of said series are spaced from the bottom wires of the side walls 3, 4. The space between the pairs of wires is greater than the space between the outer pairs of wires and said side walls. The wires of each of said pairs are designated 23, 24 and each is bent at spaced intervals to form it with a series of upstanding inverted yoke shape parts 25. The parts 25 of wire 23 align with the parts 25 of the wire 24. The parts 25 of the wire 24 of one pair of wires are connected to the parts 25 of the wire 23 of an adjacent pair of wires by upstanding yoke-shaped members 26 having the bases thereof aligning with the non-bent portions 27 of the wires 23, 24. The bases of the members 26 form supports. The non-bent portions 27 of the wires 23, 24 also form supports, and the bent parts 25 of the wires 23, 24 provide stops.

The braces 6, 7, 8, 9, 10 and 11 coact with the side and endwalls to form the tray into six compartments, each for the reception of four glasses 28. The braces 8 and 9 are arranged directly upon the pairs of wires 23, 24 and the brace 11. The end and side walls, as well as the braces 6, 7, 8, 9 and 10 constitute stops for limiting the shifting of the glasses when positioned into the tray. The braces 6, 7, 8, 9, 10 and 11 are encompassed at their ends by the loops 22.

Each glass 28 when mounted in the tray has a five point suspension provided by the base of a member 26 and a pair of non-bent portions 27 of the wires 23, 24 of each pair. A part 25 of each wire 23, 24 of a pair of wires extends upwardly into the glass. The space 30 between the pairs of wires is for the passage of brushes for washing the outer periphery of the glass, and the space 31 between each pair of wires 23, 24 is for the passage of brushes for washing the interior of the glasses and for the passage of the rinsing water discharging nozzles and heated air into the glasses. When a glass is inverted and subjected to the washing and rinsing operations the upper portion thereof is subjected to a brushing action from a holding down top brush or cap in a manner as set forth in my application aforesaid.

What I claim is:

1. A glass holding tray comprising skeleton side and end walls and a skeleton bottom, said bottom being formed of a series of spaced parallel pairs of spaced parallel supporting wires and spaced parallel rows of spaced parallel supports disposed at right angles to said wires, said wires and supports coacting for supporting glasses positioned within the tray, each wire of each pair of wires having spaced stretches providing spaced parallel upstanding stops, the stops of the wires of each pair of wires being arranged in pairs, the stops of each pair being parallel, each pair of stops for extension into a glass supported within the tray, each of said supports being connected at one end to one of the wires of one pair of wires and at its other end to one of the wires of a pair of wires adjacent the said one pair, the outer wires of the outer pairs of wires of said series of pairs being spaced from said side walls.

2. A glass holding tray comprising skeleton side and end walls and a skeleton bottom, said bottom being formed of a series of spaced parallel pairs of spaced parallel supporting wires and spaced parallel rows of spaced parallel supports disposed at right angles to said wires, said wires and supports coacting for supporting glasses positioned within the tray, each wire of each pair of wires having spaced stretches providing spaced parallel upstanding stops, the stops of the wires of each pair of wires being arranged in pairs, the stops of each pair being parallel, each pair of stops for extension into a glass supported within the tray, each of said supports being connected at one end to one of the wires of one pair of wires and at its other end to one of the wires of a pair of wires adjacent the said one pair, the outer wires of the outer pairs of wires of said series of pairs being spaced from said side walls, and said wires being secured at their ends to said end walls above the lower ends of the latter.

3. A glass holding tray comprising skeleton side and end walls and a skeleton bottom, said bottom being formed of a series of spaced parallel pairs of spaced parallel supporting wires and spaced parallel rows of spaced parallel supports disposed at right angles to said wires, said wires and supports coacting for supporting glasses positioned within the tray, each wire of each pair of wires having spaced stretches providing spaced parallel upstanding stops, the stops of the wires of each pair of wires being arranged in pairs, the stops of each pair being parallel, each pair of stops for extension into a glass supported within the tray, each of said supports being connected at one end to one of the wires of one pair of wires and at its other end to one of the wires of a pair of wires adjacent the said one pair, the outer wires of the outer pairs of wires of said series of pairs being spaced from said side walls, a pair of spaced parallel upper and a pair of spaced parallel lower horizontally disposed combined bracing and partitioning members having their ends secured to the inner faces of the side walls below the upper and above the lower ends of the latter, the said upper members being arranged in superposed spaced alignment with said lower members, and an upper and a lower longitudinally extending combined bracing and partitioning member arranged in superposed spaced alignment and secured to the inner faces of the end walls below the upper and above the lower ends of the said end walls, said horizontal members extending between said longitudinal members.

4. A glass holding tray comprising skeleton side and end walls and a skeleton bottom, said bottom being formed of a series of spaced parallel pairs of spaced parallel supporting wires and spaced parallel rows of spaced parallel supports disposed at right angles to said wires, said wires and supports coacting for supporting glasses positioned within the tray, each wire of each pair of wires having spaced stretches providing spaced parallel upstanding stops, the stops of the wires of each pair of wires being arranged in pairs, the stops of each pair being parallel, each pair of stops for extension into a glass supported within the tray, each of said supports being connected at one end to one of the wires of one pair of wires and at its other end to one of the wires of a pair of wires adjacent the said one pair, the outer wires of the outer pairs of wires of said series of pairs being spaced from said side walls, a pair of spaced parallel upper and a pair of spaced parallel lower horizontally disposed combined bracing and partitioning members having their ends secured to the inner faces of the side walls below the upper and above the lower ends of the latter, the said upper members being arranged in superposed spaced alignment with said lower members, and an upper and a lower longitudinally extending combined bracing and partitioning member arranged in superposed spaced alignment and secured to the inner faces of the end walls below the upper and above the lower ends of the said end walls, said horizontal members extending between said longitudinal members, and said wires being secured at their ends to said end walls above the lower ends of the latter.

5. A glass holding tray comprising skeleton side and end walls and a skeleton bottom, said bottom being formed of a series of spaced parallel pairs of spaced parallel supporting wires and spaced parallel rows of spaced parallel supports disposed at right angles to said wires, said wires and supports coacting for supporting glasses positioned within the tray, each wire of each pair of wires having spaced stretches providing spaced parallel upstanding stops, the stops of the wires of each pair of wires being arranged in pairs, the stops of each pair being parallel, each pair of stops for extension into a glass supported within the tray, each of said supports being connected at one end to one of the wires of one pair of wires and at its other end to one of the wires of a pair of wires adjacent the said one pair, the outer wires of the outer pairs of wires of said series of pairs being spaced from said side walls, and spaced vertically disposed skeleton braces secured to the inner faces of said side and end walls.

6. A glass holding tray comprising skeleton end walls and a skeleton bottom, said bottom being formed of a series of spaced parallel pairs of spaced parallel supporting wires and spaced parallel rows of spaced parallel supports disposed at right angles to said wires, said wires and supports coacting for supporting glasses positioned within the tray, each wire of each pair of wires having spaced stretches providing spaced parallel upstanding stops, the stops of the wires of each pair of wires being arranged in pairs, the stops of each pair being parallel, each pair of stops for extension into a glass supported within the tray, each of said supports being connected at one end to one of the wires of one pair of wires and at its other end to one of the wires of a pair of wires adjacent the said one pair, the outer wires of the outer pairs of wires of said series of pairs being spaced from said side walls, and said wires being secured at their ends to said end walls above the lower ends of the latter, and spaced vertically disposed skeleton braces secured to the inner faces of said side and end walls.

7. The invention as set forth in claim 1 having said supporting wires disposed in the same plane, said stops of inverted U-shape, said supports in the form of vertically disposed yokes having their bases in the same plan as the supporting wires, and each support having its sides arranged below and secured at their upper ends to the upper ends of a pair of spaced parallel stops.

8. A glass holding tray for glassware washing machines comprising a pair of superimposed rectangular upper open members, a pair of superimposed rectangular open lower members disposed in parallel spaced relation with respect to said upper members, a set of superposed rectangular open intermediate members arranged in parallel spaced relation relative to each other and in parallel spaced relation relative to said upper and lower members, corner braces common to, arranged within and anchored to said upper, intermediate and lower members, said members being formed with opposed stretches constituting the end walls and opposed stretches constituting the side walls of the tray, spaced parallel skeleton brace members common to, arranged within and secured to the inner faces of the stretches of said upper, intermediate and lower members, a series of spaced parallel pairs of spaced parallel supporting wires having their ends anchored between the stretches of said lower members which form parts of the end walls of the tray, spaced parallel rows of spaced parallel supports disposed at right angles to said wires and coacting with the latter for supporting glasses positioned in the tray, each wire of each pair of wires being formed with spaced parallel upstanding stops, the stops of the wires of each pair of wires being arranged in pairs, the stops of each pair being parallel, each pair of stops for extension into a glass supported by the tray, and each of said supports being connected at one end to one of the stops on one of the wires of one pair of wires and at its other end to one of the stops on one of the wires of a pair of wires adjacent the said one pair of wires.

9. The invention as set forth in claim 8 provided with two parallel pairs of upper and lower horizontally disposed superposed combined bracing and partitioning members anchored at their ends to the side walls of the tray within opposed brace members, and an upper and a lower longitudinally disposed combined bracing and partitioning member arranged in superposed spaced alignment anchored at their ends to the end walls of the tray within opposed brace members, said horizontal members being positioned between said longitudinal members.

10. The invention as set forth in claim 8 provided with a pair of superposed spaced parallel combined bracing and partitioning members disposed at the longitudinal center of and anchored to the end walls of the tray, and two spaced parallel pairs of superposed spaced combined bracing and partitioning members disposed transversely of and anchored to the side walls of the tray and positioned between said longitudinal members.

11. A tray comprising skeleton side walls and a skeleton bottom, said bottom being formed with spaced parallel rows of spaced upstanding inverted yoke-shaped parts, the yoke-shaped parts of each row being connected together at their lower ends, and said bottom being formed with spaced rows of spaced upstanding parallel yoke-shaped parts disposed at right angles to said inverted yoke-shaped parts.

ANDERS R. LOFSTRAND, Jr.